(12) United States Patent
Maeda et al.

(10) Patent No.: US 7,337,228 B2
(45) Date of Patent: Feb. 26, 2008

(54) INFORMATION PROCESSING METHOD AND APPARATUS AND RECORDING MEDIUM FOR CONTROLLING AND SIMPLIFYING A SIGN-UP OPERATION OF AN APPARATUS OVER A NETWORK

(75) Inventors: Satoru Maeda, Kanagawa (JP); Munehiro Yoshikawa, Kanagawa (JP); Nobutaka Tani, Saitama (JP); Shinji Okazaki, Kanagawa (JP); Natsuko Yotsumoto, Tokyo (JP); Masahiro Asai, Kanagawa (JP); Mami Uchida, Saitama (JP); Takaaki Miura, Tokushima (JP); Katsuhisa Takata, Tokushima (JP)

(73) Assignees: Sony Corporation, Tokyo (JP); Justsystem Corporation, Tokushima (JP)

( * ) Notice: Subject to any disclaimer, the term of this patent is extended or adjusted under 35 U.S.C. 154(b) by 724 days.

(21) Appl. No.: 09/996,019

(22) Filed: Nov. 28, 2001

(65) Prior Publication Data

US 2002/0087677 A1 Jul. 4, 2002

(30) Foreign Application Priority Data

Nov. 30, 2000 (JP) ............................. 2000-365605

(51) Int. Cl.
*G06F 15/16* (2006.01)
(52) U.S. Cl. ...................... 709/227; 709/201; 709/218; 709/217; 709/223; 709/229; 370/282; 705/408
(58) Field of Classification Search ................ 709/201, 709/217, 223, 229, 218, 224; 370/282; 705/408, 705/5; 455/411
See application file for complete search history.

(56) References Cited

U.S. PATENT DOCUMENTS

| | | | | |
|---|---|---|---|---|
| 5,889,860 | A * | 3/1999 | Eller et al. ..................... | 705/51 |
| 5,917,467 | A * | 6/1999 | Yoshimura .................. | 345/581 |
| 6,005,850 | A * | 12/1999 | Moura et al. ............... | 370/282 |
| 6,023,698 | A * | 2/2000 | Lavey et al. .................. | 707/10 |
| 6,167,448 | A * | 12/2000 | Hemphill et al. ........... | 709/224 |
| 6,178,430 | B1 * | 1/2001 | Cohen et al. ............. | 715/501.1 |
| 6,201,958 | B1 * | 3/2001 | Boucher ..................... | 455/411 |
| 6,219,669 | B1 * | 4/2001 | Haff et al. ..................... | 707/10 |
| 6,345,288 | B1 * | 2/2002 | Reed et al. ................. | 709/201 |
| 6,408,286 | B1 * | 6/2002 | Heiden ....................... | 705/408 |
| 6,411,992 | B1 * | 6/2002 | Srinivasan et al. ......... | 709/218 |

(Continued)

Primary Examiner—William Vaughn
Assistant Examiner—Thanh T Nguyen
(74) Attorney, Agent, or Firm—Frommer Lawrence & Haug LLP; William S. Frommer; Thomas F. Presson

(57) ABSTRACT

An information processing method and apparatus for enabling more prompt sign-up. A network management server at step S62 received am equipment serial number from an information processing apparatus and, at step s63, references a database to retrieve a received equipment serial number. If the equipment serial number has not been found, the program moves to step S16 where a command for initiating manual setting is sent to an information processing apparatus. If the equipment serial number has been found, the program moves to step S81 to verify whether or not the admittance made or admittance not as yet made, recorded in the database in association with the equipment serial number received is admittance made. If the verified result indicates admittance not as yet made, the program moves to step S82 where the network management server sends an automatic setting initiating command to the information processing apparatus.

20 Claims, 14 Drawing Sheets

U.S. PATENT DOCUMENTS

| | | |
|---|---|---|
| 6,442,598 B1 * | 8/2002 | Wright et al. ............... 709/217 |
| 6,615,258 B1 * | 9/2003 | Barry et al. ................ 709/223 |
| 6,658,598 B1 * | 12/2003 | Sullivan ..................... 714/25 |
| 6,810,423 B1 * | 10/2004 | Gonno et al. ............... 709/229 |
| 6,826,512 B2 * | 11/2004 | Dara-Abrams et al. ..... 702/183 |
| 7,194,426 B1 * | 3/2007 | Box ............................ 705/26 |

* cited by examiner

| EQUIPMENT SERIAL NUMBERS | 0001 | 0002 | — |
|---|---|---|---|
| USER INFORMATION | * * * | * * * | — |
| MAIL ADDRESS | aaa@mail.bbb.co.jp | ccc@mail.ddd.co.jp | — |
| PASSWORD | 12345 | 98760 | — |
| SERVER INFORMATION | * * * | * * * | * * * |
| ADMITTED OR NOT YET ADMITTED | NOT ADMITTED YET | ADMITTED | NOT ADMITTED YET |

FIG.3

EQUIPMENT SERIAL NUMBER BEING SENT TO SERVER. WAIT FOR SOME TIME.

FIG.7

INPUT USER INFORMATION

NAME
ADDRESS
TEL NUMBER
MAIL ADDRESS
PASSWORD
ACCESS POINT

THERE IS ERROR IN INPUT USER INFORMATION.
RE-CONFIRM INFORMATION AND RE-ENTER.

PROCEDURE COMPLETED.
FIG.11
INPUT PASSWORD
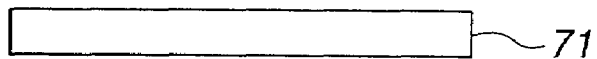
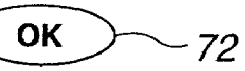
FIG.12

ALREADY REGISTERED.

FIG.13

INFORMATION PROCESSING METHOD AND APPARATUS AND RECORDING MEDIUM FOR CONTROLLING AND SIMPLIFYING A SIGN-UP OPERATION OF AN APPARATUS OVER A NETWORK

BACKGROUND OF THE INVENTION

1. Field of the Invention

This invention relates to an information processing method and apparatus and a recording medium. More particularly, it relates to an information processing method and apparatus and a recording medium in which it is possible to simplify a sign-up operation for connection to the Internet.

2. Description of Related Art

Recently, a network system, exemplified first of all by the Internet, has come into widespread use. With the aid of a personal computer having the communication function, a user may establish a connection through a communication network, such as a telephone network, to exploit a variety of the information and services available via the Internet.

It should be noted that, for a user unaccustomed to computer operations, an electronic equipment which enables connection to the Internet more readily is more desirable than a personal computer necessitating complex operations.

In order to meet this demand, a television receiver having the function of connection to the Internet has now made its debut.

This television receiver, having the function of connection to the Internet, is able not only to receive signals of television broadcast, to select a channel desired by the user to permit the user to view the channel, according to its primary function, but also to permit the connection to the Internet over a communication network, such as telephone network, to have the picture or text information furnished and demonstrated on a demonstration surface, such as a display, or to enable facilitated formation, transmission or reception of an E-mail.

If a user who has purchases a television receiver, having the function of connection to the Internet, as described above, is desirous to use the various information or services presented over the Internet, the or she has to make a contact with an Internet connection service, called an Internet provider, to register a connection ID and so forth on the equipment.

As a typical sign-up method, the user selects such an Internet provider who is most suitable for the user, such as one having an access point geographically close to his or her site or furnishing services the or she desires, and procures an application form for subscription from the Internet provider. The user fills in necessary items in the application form for subscription and mails or otherwise sends the application form to the Internet provider to notify the Internet provider of the user information. Based on the user information, supplied from the user, the Internet provider accords the sign-up information, such as a connection ID. The user acquires the sign-up information and inputs it to an equipment, such as a personal computer.

However, in the case of the conventional sign-up method, carried out in accordance with the above-described sequence, input errors may be committed when inputting the so acquired information to the equipment due to complexity in the subscription procedure.

Moreover, the processing operations in registering a provider is time-consuming.

SUMMARY OF THE INVENTION

It is therefore an object of the present invention to provide a sign-up system whereby the sign-up may be completed readily and promptly.

In one aspect, the present invention provides a information processing apparatus connected to a network, including recording means for recording the identification information pertinent to an other information processing apparatus, receiving means for receiving the identification information on the other information processing apparatus, sent from the other information processing apparatus, when the other information processing apparatus is connected via the network, verifying means for verifying whether or not the identification information received by the receiving means has already been recorded in the other recording means, and controlling means for controlling the other information processing apparatus over the network based on verified results by the verifying means.

The information processing apparatus may include the serial number of the other information processing apparatus.

The controlling means may cause the other information processing apparatus to execute first setting processing when it is verified that the identification information received by the receiving means has already been recorded in the recording means, the controlling means causing the other information processing apparatus to execute second setting processing when it is verified that the identification information received by the receiving means has not as yet been recorded in the recording means.

The first and setting processing and the second setting processing may represent setting processing necessary for the other information processing apparatus to utilize the network.

The controlling means may send an address on the network of a server used for connecting the other information processing apparatus to the network, to the other information processing apparatus, and sets the address so sent, as the information necessary for the other information processing apparatus to utilize the network.

The recording means may further record the inherent information for specifying a user of the other information processing apparatus, with the controlling means requesting transmission of the inherent information to the other information processing apparatus if it is verified that the identification information received by the receiving means has already been recorded in the recording means.

The inherent information may include a password.

If it is verified that the identification information received by the receiving means has as yet not been recorded on the recording means, the controlling means may request the other information processing apparatus to transmit the information on a user exploiting the other information processing apparatus.

In another aspect, the present invention provides an information processing method for an information processing apparatus connected to a network, including a recording controlling step of controlling the recording of the identification information pertinent to an other information processing apparatus, a receiving step of receiving the identification information on the other information processing apparatus, sent from the other information processing apparatus when the other information processing apparatus is connected via the network, a verifying step of verifying whether or not the identification information received by processing in the receiving step has already been controlled as to recording in the other recording step in the processing in the recording controlling step, and a controlling step of controlling the other information processing apparatus over the network based on verified results by the processing in the verifying step.

In still another aspect, the present invention provides a recording medium having recorded thereon a computer-readable program controlling an information processing apparatus connected to a network, in which the program includes a recording controlling step of controlling the recording of the identification information pertinent to an other information processing apparatus, a receiving step of receiving the identification information on the other information processing apparatus, sent from the other information processing apparatus when the other information processing apparatus is connected via the network, a verifying step of verifying whether or not the identification information received by the processing in the receiving step has already been controlled as to recording in the processing in the recording controlling step, and a controlling step of controlling the other information processing apparatus over the network based on verified results by the processing in the verifying step.

In the first information processing method and apparatus, and in the recording medium, according to the present invention, when the identification information pertinent to the other information processing apparatus is recorded and the other information processing apparatus is connected over a network, the identification information pertinent to the other information processing apparatus, transmitted from the other information processing apparatus, is received, and the so received identification information is, verified as to whether or not the information has already been recorded. The other information processing apparatus is controlled based on the verified results. Thus, the sign-up can be completed extremely readily and promptly.

In still another aspect, the present invention provides an information processing apparatus connected to a network, including storage means for storing the identification information, transmission means for transmitting the identification information stored in the storage means over the network to an other information processing apparatus, receiving means for receiving the control information transmitted from the other information processing apparatus over the network, based on the identification information transmitted from the transmission means, and setting means for setting the information necessary for utilizing the network based on the control information received by the receiving means.

The setting means may set the information necessary for exploiting the network in a first mode when the control information received by the receiving means is the first control information, with the setting means setting the information necessary for exploiting the network in a second mode when the control information received by the receiving means is the second control information.

The setting means executes first setting processing when the identification information transmitted by the transmission means has already been recorded in the other information processing apparatus, with the setting means executing second setting processing when the identification information transmitted by the transmission means has already been recorded in the other information processing apparatus.

The first setting processing and the second setting processing may represent information setting processing necessary for the information processing apparatus to exploit the network.

The setting means may receive an address on the network of a server connecting the information processing apparatus to the network, as the information necessary in exploiting the network, and sets the so received address.

The other information processing apparatus may further store the inherent information used for specifying a user of the information processing apparatus, with the setting means transmitting the inherent information to the other information processing apparatus if the identification information transmitted by the transmission means has already been recorded in the other information processing apparatus.

The inherent information may include a password.

The setting means may transmit the information pertinent to a user employing the other information processing apparatus to the other information processing apparatus if the identification information transmitted by the transmission means has as yet not been recorded in the other information processing apparatus.

In still another aspect, the present invention provides an information processing method for an information processing apparatus connected to a network, including a storage controlling step of controlling the storage of the identification information, a transmission step of transmitting the identification information controlled as to storage by processing in the storage controlling step over the network to an other information processing apparatus, a receiving step of receiving the control information transmitted from the other information processing apparatus over the network, based on the identification information transmitted by processing in the transmission step, and a setting step of setting the information necessary for utilizing the network based on the control information received by processing in the receiving step.

In yet another aspect, the present invention provides a recording medium having recorded thereon a computer-readable program controlling an information processing apparatus connected to a network, in which the program includes a storage controlling step of controlling the storage of the identification information, a transmission step of transmitting the identification information controlled as to storage by processing in the storage controlling step over the network to an other information processing apparatus, a receiving step of receiving the control information transmitted from the other information processing apparatus over the network, based on the identification information transmitted by processing in the transmission step and a setting step of setting the information necessary for utilizing the network based on the control information received by processing in the receiving step.

In the second information processing method and apparatus, and in the program recorded on the recording medium, the identification information stored is transmitted over a network to the other information processing apparatus, the identification information stored is transmitted over the network to the other information processing apparatus, and the identification information transmitted over the network from the other information processing apparatus based on the transmitted identification information is received. The information necessary in exploiting the network is set based on the so received control information. Thus, the sign up can be completed extremely readily and promptly.

BRIEF DESCRIPTION OF THE DRAWINGS

FIG. 3 shows an instance of the information stored in a database of FIG. 1.

FIG. 7 shows an illustrative display of a data input picture.

FIG. 8 shows an illustrative display of a selected picture.

FIG. 11 shows an illustrative display of a message picture.

FIG. 12 shows an illustrative display of a data input picture.

FIG. 13 shows an illustrative display of a message picture.

DESCRIPTION OF THE PREFERRED EMBODIMENTS

Figure 1:
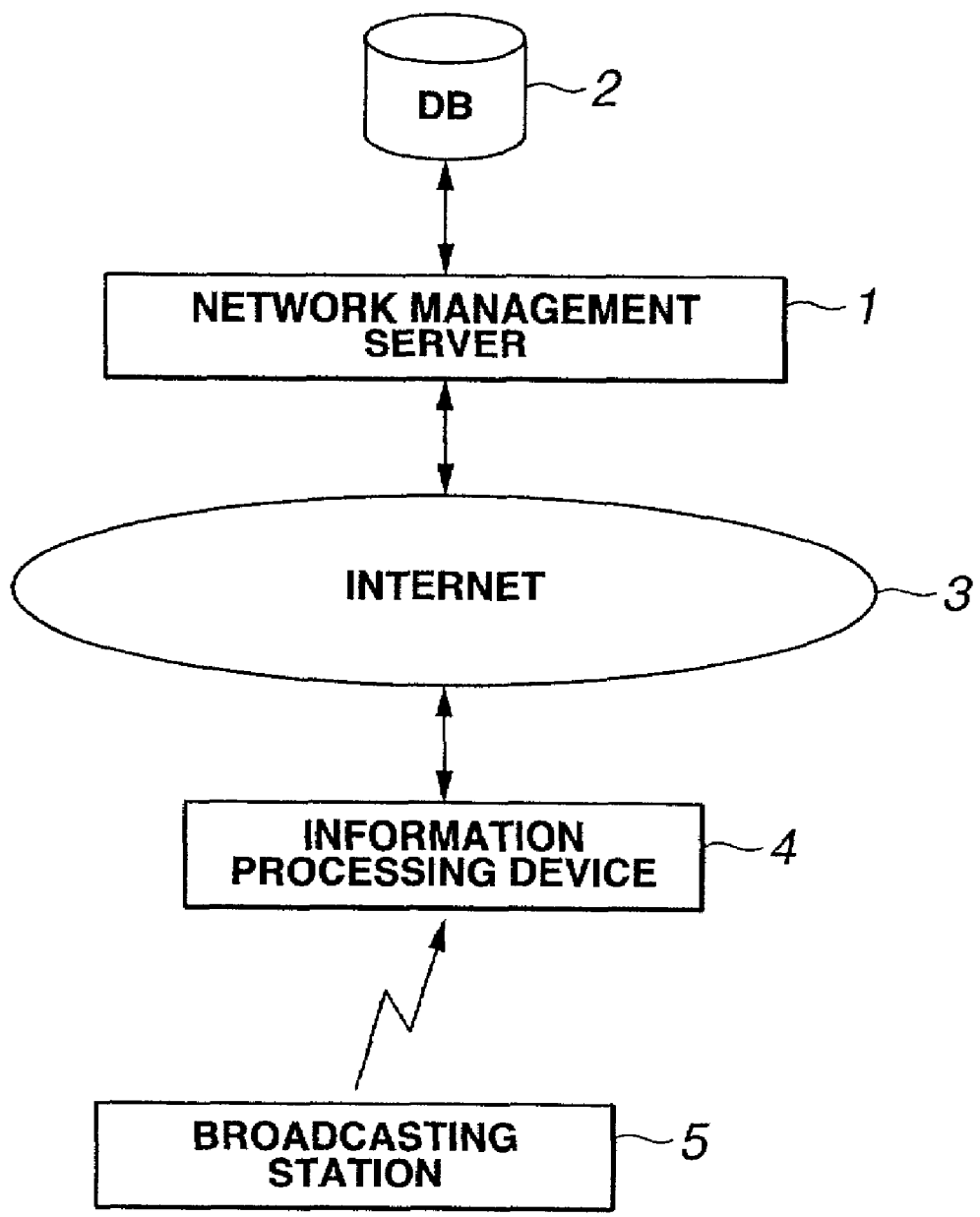
FIG. 1 shows an illustrative structure of a sign-up system embodying the present invention.

FIG. 1 shows an illustrative structure of a sign-up system according to the present invention. This illustrative structure includes a network management server 1 and an information processing apparatus 4, interconnected over the Internet 3.

To the network management server 1 is connected a database (DB) 2, in which there are stored the server information including the address of the network management server 1 on the network, such as Internet 3, for example, IP (Internet protocol) address, the user information on the user whose subscription procedure (contract process) has been completed.

The network management server 1 is a computer executing the processing, as later explained, in accordance with a server program stored in a hard disc drive enclosed in the computer's CPU.

The information processing apparatus 4 has the function of receiving television broadcast, aired by a broadcasting station 5, and the function of establishing connection to the network management server 1 over the Internet 3. Therefore, the user of the information processing apparatus 4 is able not only to view the television program, aired by the broadcasting station 5, but also to access the network management server 1 to receive the sign-up information.

Figure 2:
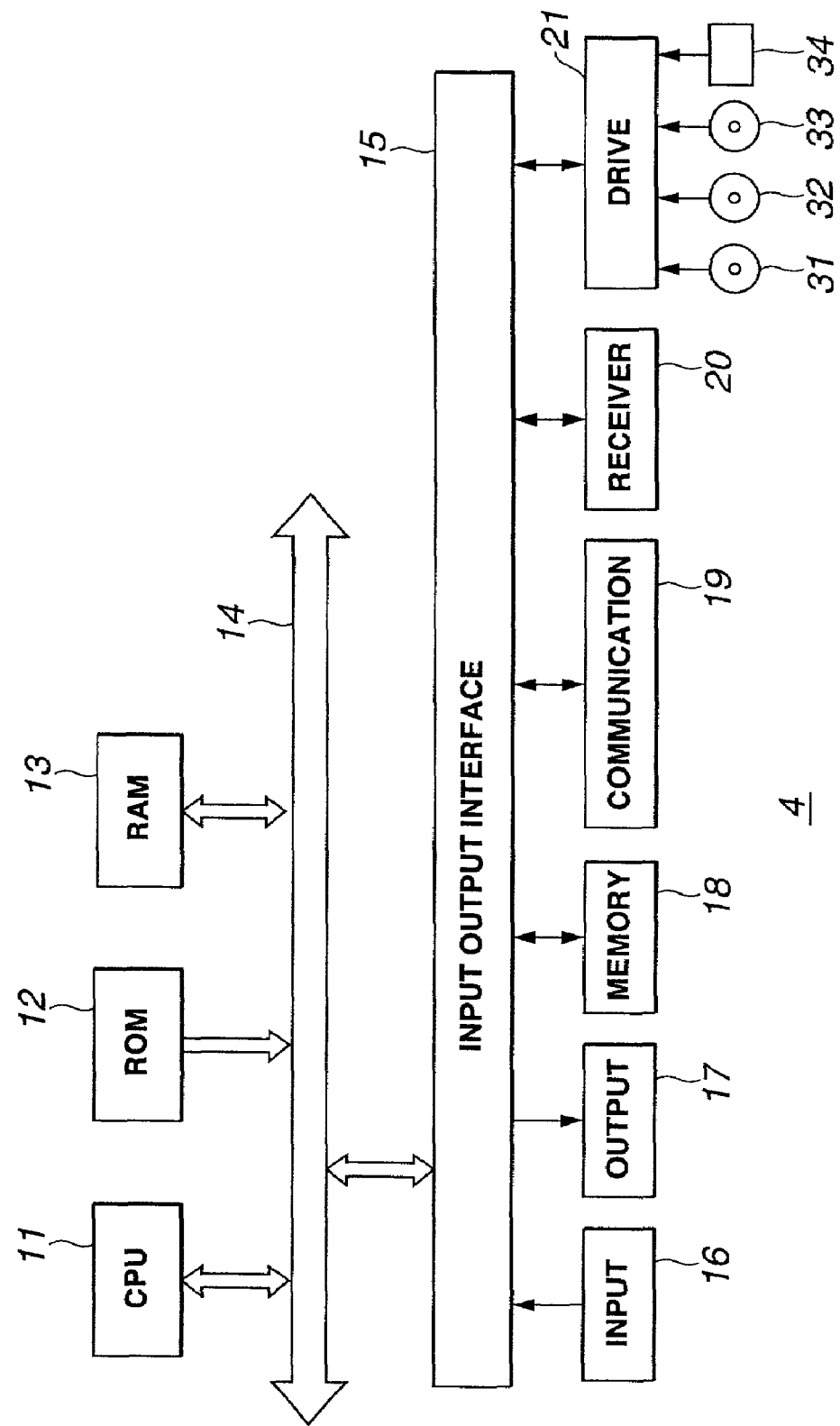
FIG. 2 is a block diagram showing an illustrative structure of the information processing apparatus of FIG. 1.

FIG. 2 shows an illustrative structure of the information processing apparatus 4. A CPU (central processing unit) 11 executes a variety of processing operations in accordance with the program loaded from a storage unit 18 to a RAM (random access memory) 13. There is also stored in the RAM 13 data necessary for the CPU 11 to execute a variety of processing operations.

The CPU 11, ROM 12 and the RAM 13 are interconnected over a bus 14, while being connected to an input output interface 15.

To the input output interface 15 are connected an input unit 16, comprised of a keyboard, a mouse, a switch, a button and a remote commander, an output unit 17 made up of a CRT (cathode ray tube) or a LCD (liquid crystal display), a storage unit 18, made up e.g. of a hard disc, a communication unit 19 made up of a modem or a terminal adapter, and a receipt unit 20 for receiving and demodulating electrical waves from the broadcasting station 5. The communication unit 19 is responsible for communication processing over the Internet 3.

To the input output interface 15 is also connected a drive 21 as necessary. On this drive 21 are loaded e.g., a magnetic disc 31, an optical disc 32, a magneto-optical disc 33 or a semiconductor memory 34. A computer program read out therefrom is installed as necessary on the storage unit 18.

Meanwhile, the network management server 1 is configured similarly to the above-described information processing apparatus 4 less the receipt unit 20. Therefore, the network management server 1 is not explained here in detail.

FIG. 3 shows typical information stored in the database 2. In the present instance, an equipment serial number, user information, mail address, password, server information and the information on admittance or non-admittance are stored.

In the equipment serial number, the number inherent to the information processing apparatus 4, such as product number, is stored. In the user information, the information pertinent to a user of the information processing apparatus 4, such as name, domicile address or telephone number, is stored. In the mail address, the E-mail address owned by the user of the information processing apparatus 4 is stored. In the password, the identification information required in authenticating the user employing the information processing apparatus 4 is stored. In the server information, the information pertinent to the network management server 1, such as connection ID or account, is stored. In the information on admittance or non-admittance, the information pertinent to the procedure of admittance or non-admittance of the user of the information processing apparatus 4 (sign-up) is stored.

In the instance of FIG. 3, there are stored in the first entry the equipment serial number [00001], the user information [*], mail address [aaa@mail.bbb.co.jp], password [12345], server information [*] and admittance or non-admittance [not admitted]. In the second entry, there are stored the equipment serial number [00002], the user information [*], mail address [ccc@mail:bbb.co.jp], password [98760], server information [*] and admittance or non-admittance [admitted]. In the third entry, only the server information [***] and the admittance or non-admittance [not admitted], are stored, while no other information is as yet stored.

The operation of the present embodiment is now explained.

As a pre-processing, a user contemplating to purchase the information processing apparatus 4 enters, in the application form for purchase, the user information, mail address and password, pertinent to no other than the user, in addition to the machine type name and number of the information processing apparatus 4 the or she is desirous to purchase. The user then sends it, such as by a mail, to the network management server 1, to place an order for a desired information processing apparatus 4. On receipt of the order from the user (the application form for purchase sent from the user), the network management server 1 records the information entered in the application form for purchase in association with the equipment serial number of the information processing apparatus 4 to be delivered to the user (FIG. 3).

Figure 4:
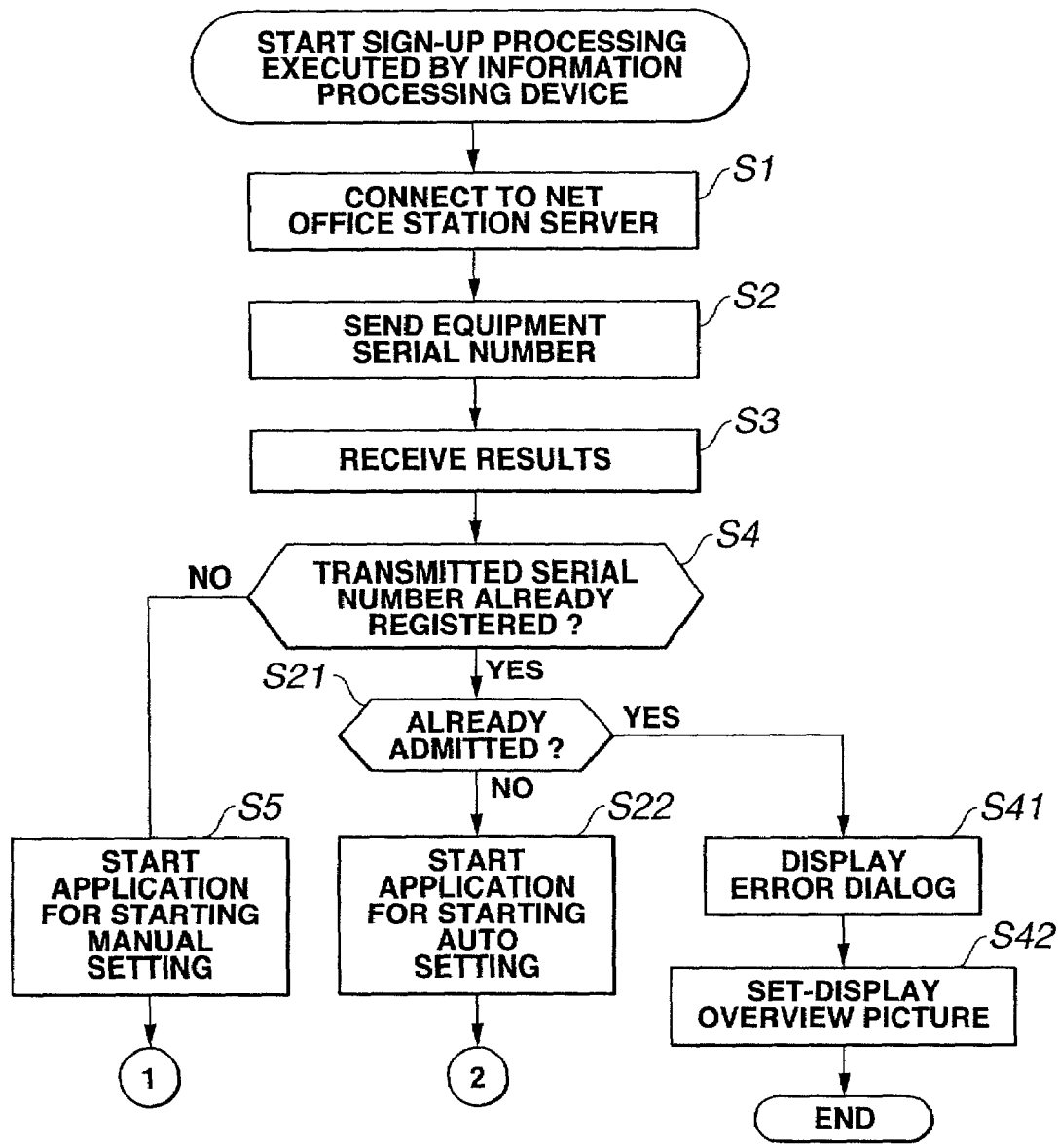
FIG. 4 is a flowchart for illustrating the processing of sign-up executed by an information processing apparatus.
Figure 5:
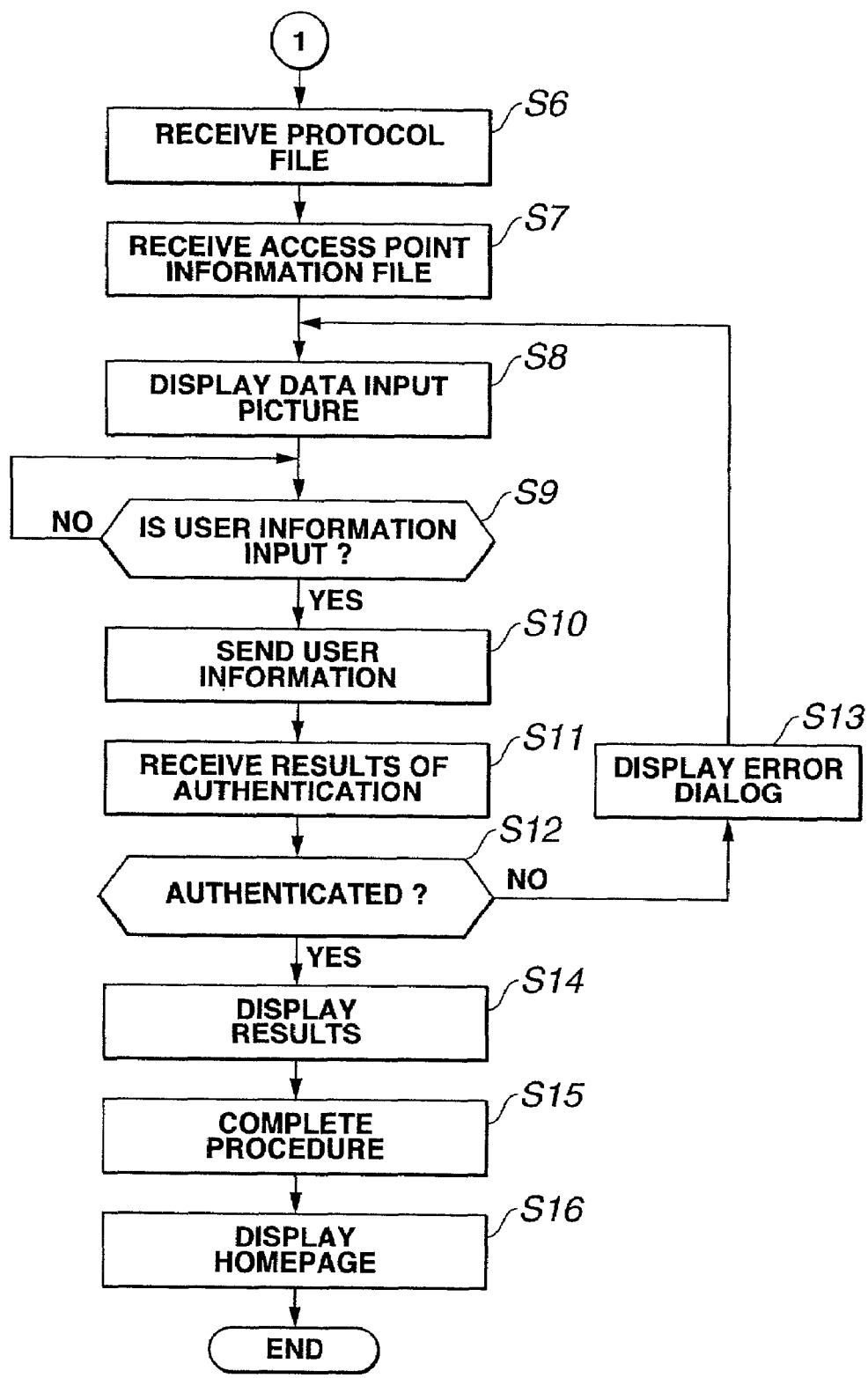
FIG. 5 is a flowchart continuing to FIG. 4.
Figure 6:
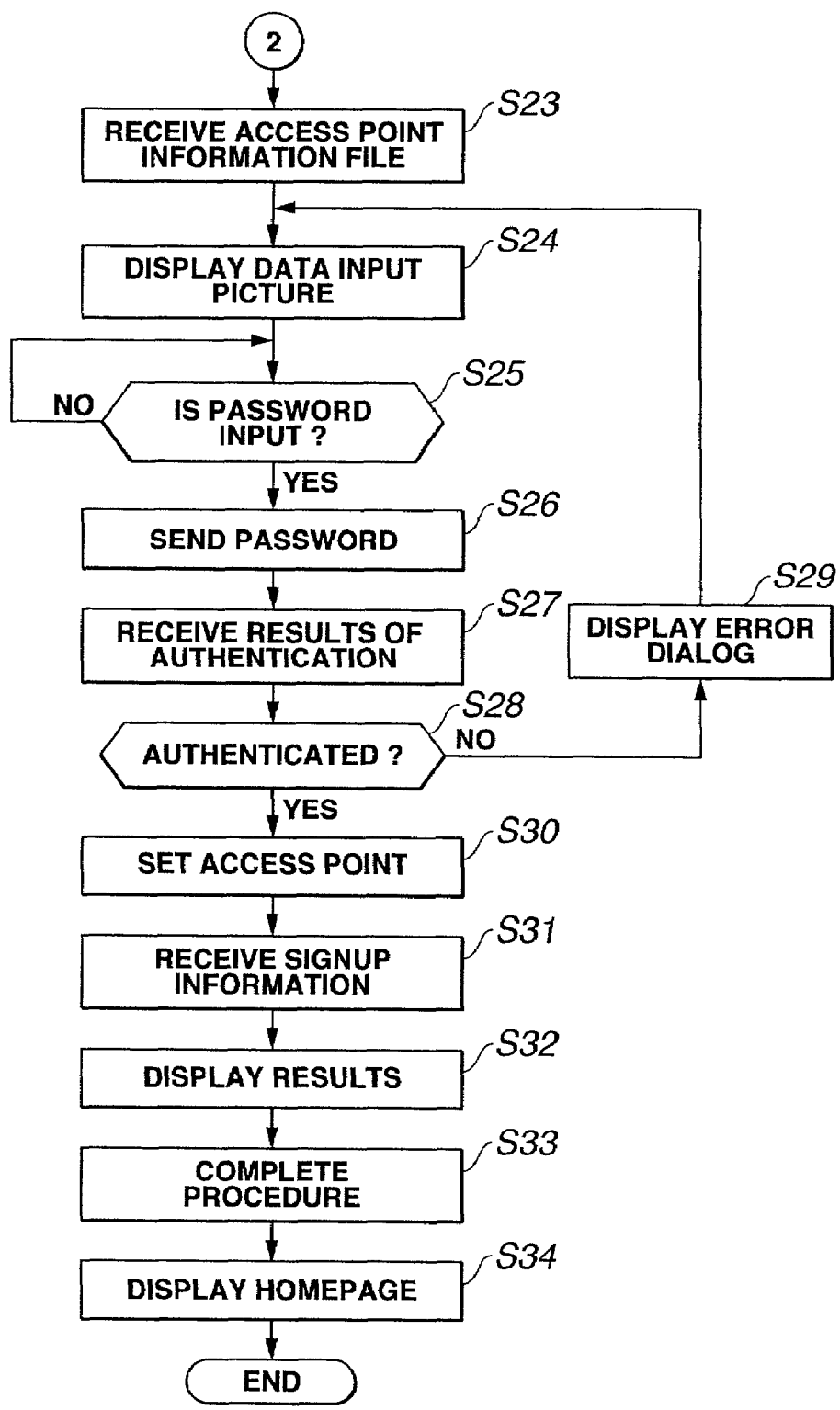
FIG. 6 is a flowchart continuing to FIGS. 4 and 5.

The user who purchased the information processing apparatus 4 then executes the processing of sign-up for connection to the Internet 2. Referring to the flowchart of FIGS. 4 to 6, the processing of sign-up executed by the information processing apparatus 4 is explained. This processing is executed by the CPU 11 when the connection tot the Internet 3 is made by the user through the communication unit 19.

At step S1, the CPU 11 connects to the network management server 1 over the communication unit 19 and the Internet 3. At step S2, the CPU 11 sends the inherent equipment serial number, stored in the information processing apparatus 4, to the network management server 1 through the communication unit 19 over the Internet 3. At this time, the CPU 11 causes a message shown in FIG. 7 reading "the equipment serial number is now being sent to the server. Please wait for some time" to be displayed in the output unit 17 to indicate what processing is now going on for the user.

On receipt of this equipment serial number, the network management server 1 references the database 2 to retrieve whether or not the equipment serial number now received has already been recorded. The network management server 1 sends the result of whether or not the equipment serial number has been recorded in the database 2 to the information processing apparatus 4.

At step S3, the CPU 11 receives the results sent from the network management server 1 through the Internet 3 and the communication unit 19. At step S4, the CPU 11 verifies, from the results received by the processing at step S3, whether or not the equipment serial number transmitted with the processing of step S2 has already been registered in the database 2.

If it is found at step S4 that the equipment serial number as sent has as yet not been registered in the database 2, that is that the preprocessing has not been done by the user of the information processing apparatus 4, the CPU 11 proceeds to step S5 to execute the program for initiating the manual setting stored in the ROM 12, based on the manual setting start command transmitted from the network management server 1.

At steps S6 and S7, the CPU 11 receives a protocol file, stating the rule for utilizing the Internet services, and the access point information file, sent from the network management server 1 through the Internet 3 and the communication unit 19.

At step S8, the CPU 11 causes a data input picture, required for manual setting, to be displayed on the output unit 17. This displays the data input picture, shown for example in FIG. 8, to be displayed on the output unit 17.

In the instance of FIG. 8, input areas for inputting the name, domicile address, telephone number, mail address, password and the access point are displayed on the data input picture. Using the input unit 19, the user enters the preset information in these input areas and presses an OK button 51 to complete the entry of the user information.

At step S9, the CPU 11 verifies whether or not the user information has been input by the user, that is whether or not the preset information has been input to the data input picture shown in FIG. 8 and the OK button 51 has been pressed. The CPU 11 is at a standby state until it is verified that the user information has been input. If it is verified that the user information has been input, the program then moves to step S10 where the CPU 11 sends the user information just input to the network management server 1 through the communication unit 19 and the Internet 3.

On receipt of the user information, the network management server 1 performs authentication processing as to whether or not the information is authentic, and sends the result of the authentication to the information processing apparatus 4.

At step S11, the CPU 11 receives the results of authentication transmitted from the network management server 1 over the Internet 3 and the through communication unit 19. At step S12, the CPU 11 verifies, from the received results of authentication, whether or not the user information has been authenticated.

If it is verified at step S12 that the user information has not been authenticated, the program moves to step S13 where the CPU 11 causes an error dialog to be displayed on the output unit 17 based on a command for error dialog display as sent from the network management server 1 along with the results of authentication. This causes a message reading: [There is an error in the input user information—confirm the information and re-enter it] as shown for example in FIG. 9 to be displayed on the output unit 17. Then, by the processing at step S9, the data input picture (FIG. 8) the data input picture, on which the user information has been input, as shown in FIG. 8, is displayed by the processing of step S9.

The program then reverts to step S8 to repeat the above-described processing.

If it is verified at step S12 that the user information has been verified, the program then moves to step S14, where the CPU 11 causes the so set information, that is the sign-up information, to be displayed on the output unit 17. This causes a setting end picture to be displayed, as shown for example in FIG. 10.

Figures 9, 10:
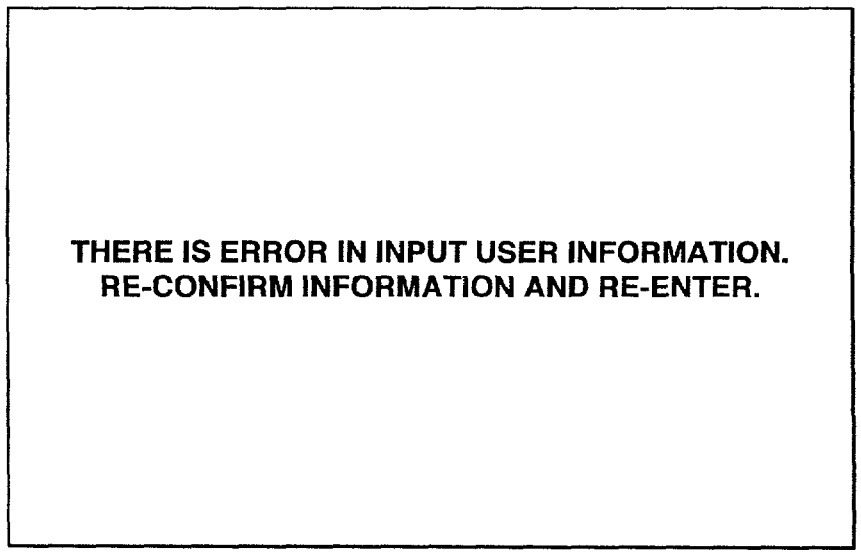
FIG. 9 shows an illustrative display of a display picture.
FIG. 10 shows an illustrative display of a setting end picture.

In the instance of FIG. 10, the name [Taro Yamada], the address [Tokyo-to Shinjuku-ku ***], the telephone number [03-3456-7890], mail address [aaa@mail.bbb.co.jp] password [12345] and the access point [Tokyo] are displayed. If, on confirming this display, the user is desirous to correct the information further, the or she may press a correction button 61 with the input unit 16 to re-try to input the user information. The program reverts to step S8. If the user has confirmed that there is no error in the user information, the or she may press an OK button 62, using the input unit 16, to notify the effect of the end of the confirmation to the network management server 1.

On receipt of the notice of the end of confirmation, the network management server 1 records the user information on the database 2 in association with the equipment serial number. The network management server 1 then reads out the server information, including the address of the network management server 1 on the Internet 3, from the database 2, and sends the so read out server information over the Internet 3 to the information processing apparatus 4, along with a message indicating the completion of the procedure.

At step S15, if the OK button has been pressed by the user, the CPU 11 records the server information, transmitted from the network management server 1, in the storage unit 18, and executes setting processing necessary for exploiting the services furnished over the Internet 3. After the end of the setting, the CPU 11 causes a message [the procedure has been finished], shown for example in FIG. 11, to be displayed on the output unit 17. This intimates the user of the end of the sign-up procedure.

By the above processing, the information processing apparatus 4 is able to utilize a variety of services presented over the Internet 3 from the network management server 1.

At step S16, the CPU 11 executes the WWW (World Wide Web) stored in the storage unit 18 to access a home page installed by the network management server 1 to display the accessed home page on the output unit 17.

If it is verified at step S4 that the equipment serial number transmitted has already been registered in the database 2, the program moves to step S21, where the CPU 11 checks, from the received results on the processing of step S3, whether or not the check as to the admittance or non-admittance, recorded in the database 2 in association with the equipment serial number transmitted, indicates the admittance.

If the result of check at step S21 indicates non-admittance, that is if it indicates non-admittance, viz. if it is found that the user of the information processing apparatus 4 has made pre-processing, the program moves to step S22 where the CPU 11 executes the program for booting an application for starting automatic setting stored in the ROM 12, based on a command for starting the automatic setting as sent from the network management server 1.

At step S23, the CPU 11 receives the access point information file sent from the network management server 1 over the Internet 3 through the communication unit 19.

At step S24, the CPU 11 causes a data input picture, required for automatic setting, to be displayed on the output unit 17. This displays a data input picture, shown for example in FIG. 12, to be displayed.

In the instance of FIG. 12, a password input area 71 is displayed in the data input picture. The user then inputs a preset password (password entered in the application form for purchase in the pre-processing) in the password input area 71, using the input unit 16, and presses the OK button 72, to complete the inputting of the password.

At step S25, the CPU 11 verifies whether or not the password has been input by the user, that is, whether the preset password has been entered to the password input area 71 of the data input picture shown in FIG. 12 and the OK button 72 has been pressed, or otherwise. The CPU 11 is in a stand-by state until it is verified that the password has been entered. If it is verified that the password has been entered, the program moves to step S26 where the CPU 11 sends the password now input to the network management server 1 through the communication unit 19 and the Internet 3.

On receipt of the password, the network management server 1 references the database 2 to verify whether or not the password coincides with the previously received password recorded in association with the equipment serial number. The network management server 1 sends the results of the authentication processing as to password coincidence to the information processing apparatus 4.

At step S27, the CPU 11 receives the results of authentication transmitted from the network management server 1 over the Internet 3 and the communication unit 19. At step S28, the CPU 11 verifies, from the results of authentication received at step S27, whether or not the password transmitted in the processing at step S26 coincides with the password registered in the database 2.

If it is verified at step S28 that the transmitted password has not been authenticated, that is, that the password transmitted is not coincident with the password registered in the database 2, the program moves to step S29 where the CPU 11 causes the output unit 17 to display an error dialog. Thus, the message shown in FIG. 9 reading: [There is an error in the input user information—confirm the information and re-enter it] as shown for example in FIG. 9 is displayed on the output unit 17. The program reverts to step S24 to repeat the above processing.

If it is verified at step S28 that the transmitted password has been authenticated, the program moves to step S30, where the user selects and specifies, using the input unit 16, a preset access point, geographically proximate to the user's territory (territory of using the information processing apparatus 4), from the access point information file received during the processing at step S23. If the user has specified the access point, as at step S30, the CPU 11 sets the specified access point. The CPU 11 sends the setting information to the network management server 1 through the communication unit 19 and the Internet 3.

On receipt of the access point setting information, the network management server 1 post-writes the information on the database 2 and reads out the server information and the user information, required for sign-up, from the database 2, to send the read-out information over the Internet 3 to the information processing apparatus 4.

At step S31, the CPU 11 receives the sign-up information (user information and the server information) sent from the network management server 1 over the Internet 3 and the communication unit 19, and records the information on the storage unit 18 to perform necessary setting processing for exploiting the services available from the Internet 3.

On completion of the setting, the CPU 11 at step S32 causes the output unit 17 to display the sign-up information, as received and set by the processing at step S31. This displays the setting end picture shown for example in FIG. 10.

If at step S33 the OK button 62 has been pressed by the user, the CPU 11 causes the message reading: [Procedure has been finished], shown for example in FIG. 11, to be displayed on the output unit 17. This informs the user of the effect that the sign-up procedure has come to a close.

By the above processing, the information processing apparatus 4 is able to utilize the various services offered from the network management server 1 over the Internet 3.

At step S34, the CPU 11 executes the WWW browser, memorized in the storage unit 18, to access the home page installed by the network management server 1 to display it on the output unit 17.

Ar step S21, if the check as to admittance or non-admittance recorded in the database 2 in association with the equipment serial number transmitted, indicates the admittance, the program moves to step S41 where the CPU 11 causes an error dialog to be displayed on the output unit 17 based on the command for displaying the error dialog transmitted from the network management server 1. That is, if sign-up is re-executed despite the fact the sign-up procedure has already come to a close, the CPU 11 is able to display a message shown for example in FIG. 13 reading: [Registration has already come to a close] to intimate the user of the fact that the sign-up procedure has already come to a close.

Figure 13:
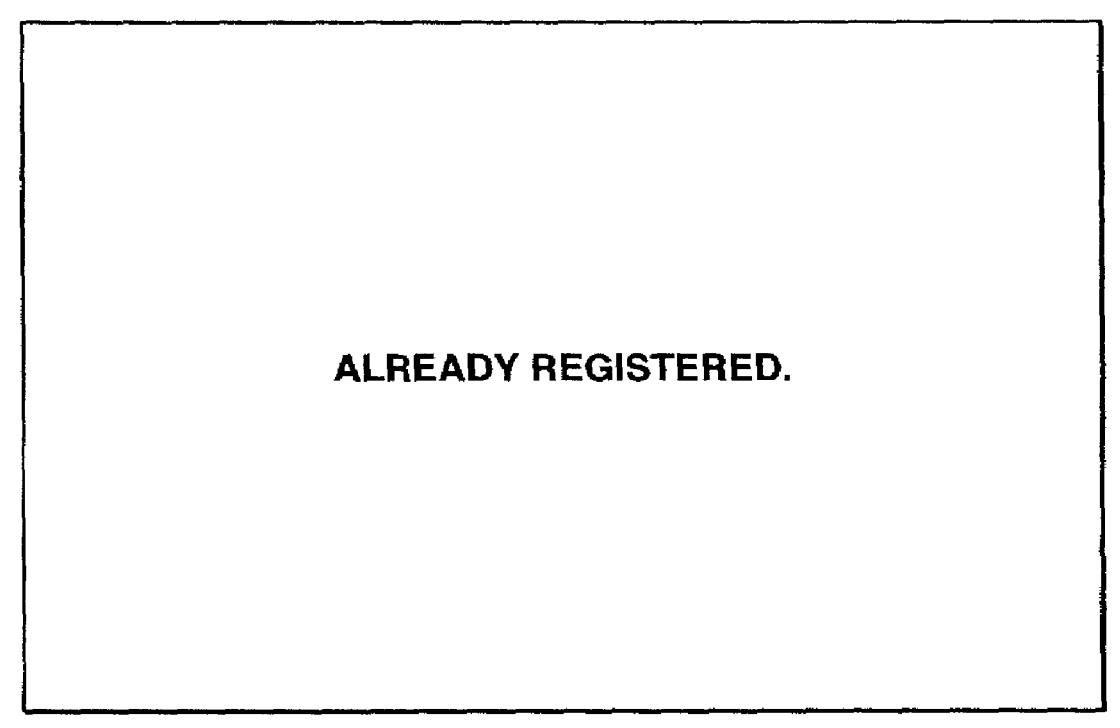

At step S42, the CPU 11 not only causes the message shown in FIG. 13 to be displayed, but also causes a setting list picture of the sign-up information as already set to be displayed. Subsequently, that is after the user is allowed to confirm the setting list picture, the processing comes to a close.

If the user has performed the pre-processing prior to the purchase of the information processing apparatus 4, the user information is recorded at the outset in the database 2. So, in executing the processing of sign-up, the information processing apparatus 4 first transmits an equipment serial number to make a check within the database 2. If there is any coincident item, the password is further sent to see whether or not this password, coincides with the password recorded in the database 2 in association with the equipment serial number. Since this double check identifies the user, the information processing apparatus 4 is able to download the user information and the server information recorded in the database 2 of the network management server 1 to complete the registration. The result is that the user is not requested to make entry processing for sign-up so that internet connection can be completed more promptly.

Figure 14:
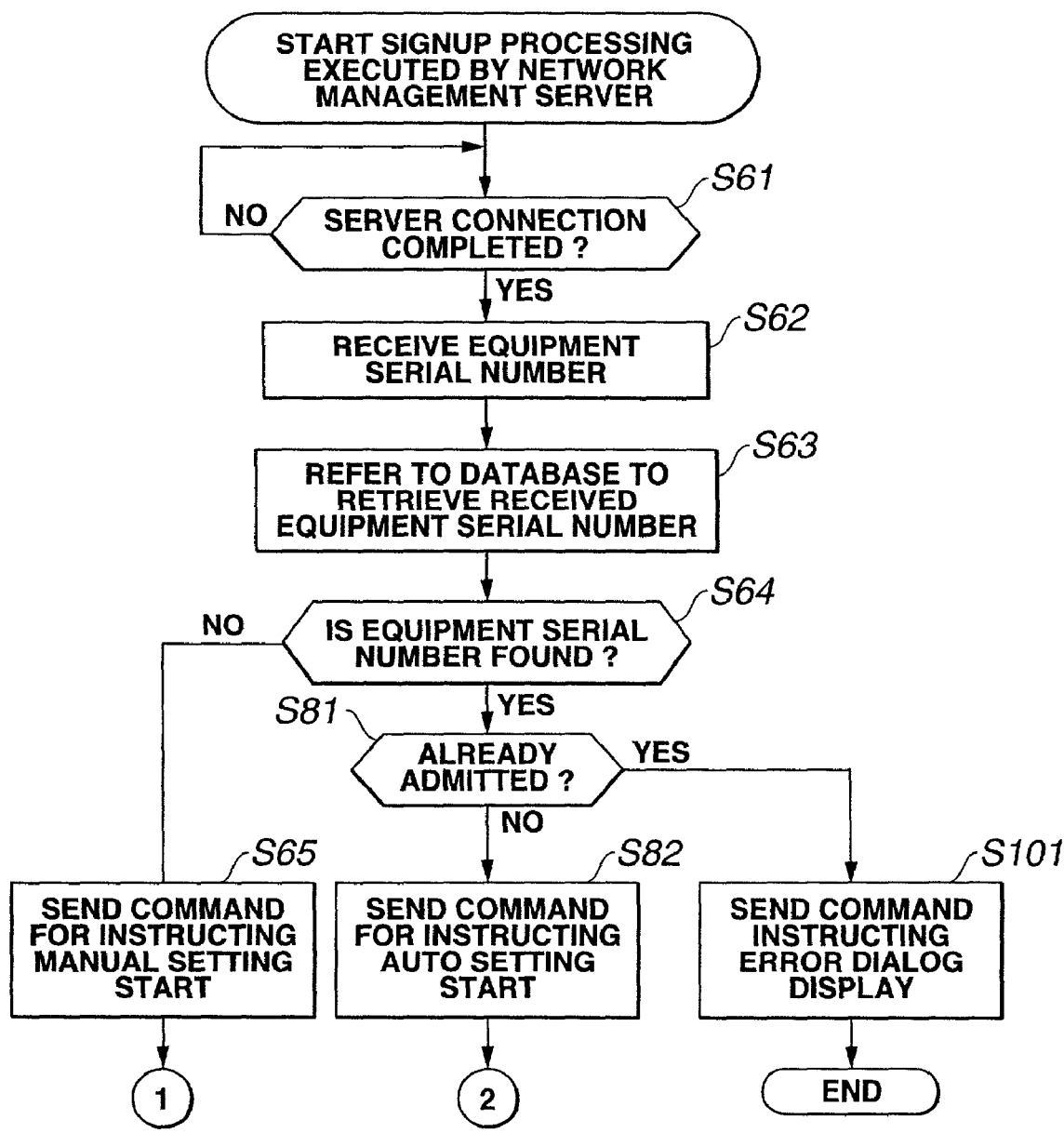
FIG. 14 is a flowchart for illustrating processing of sign-up executed by a network management server.
Figure 15:
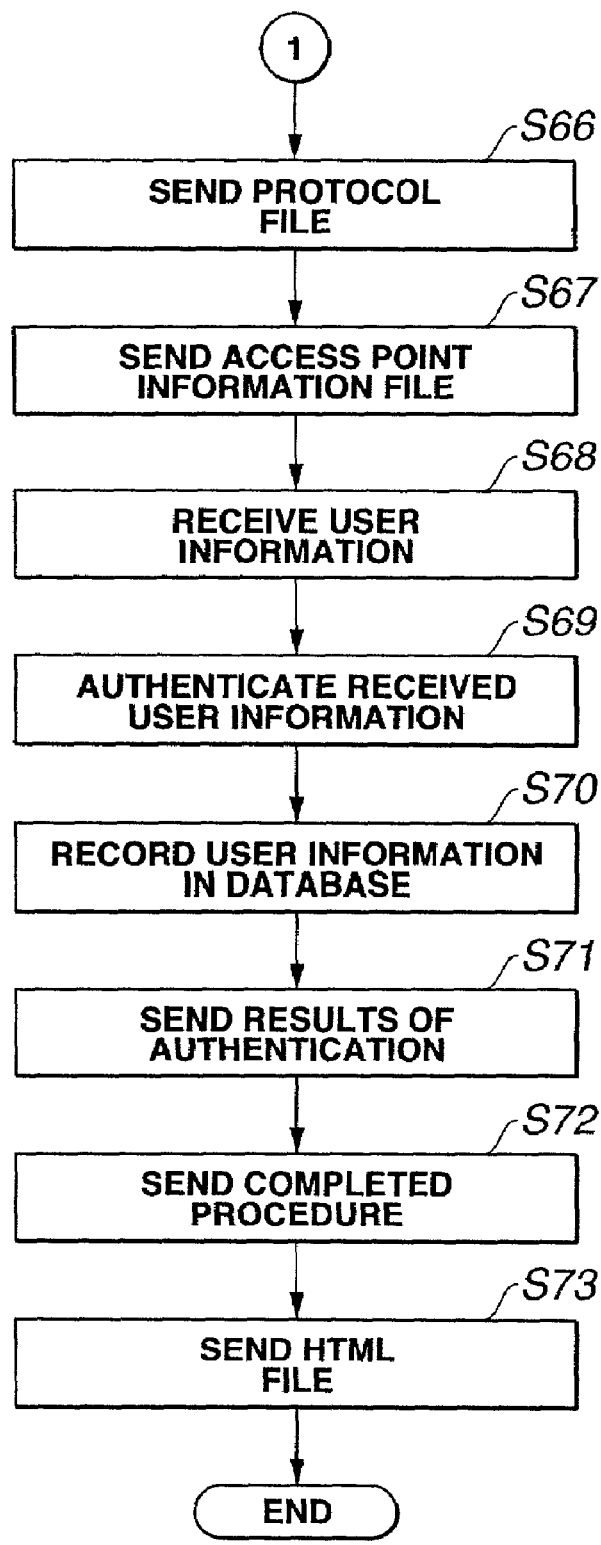
FIG. 15 is a flowchart continuing to FIG. 14.
Figure 16:
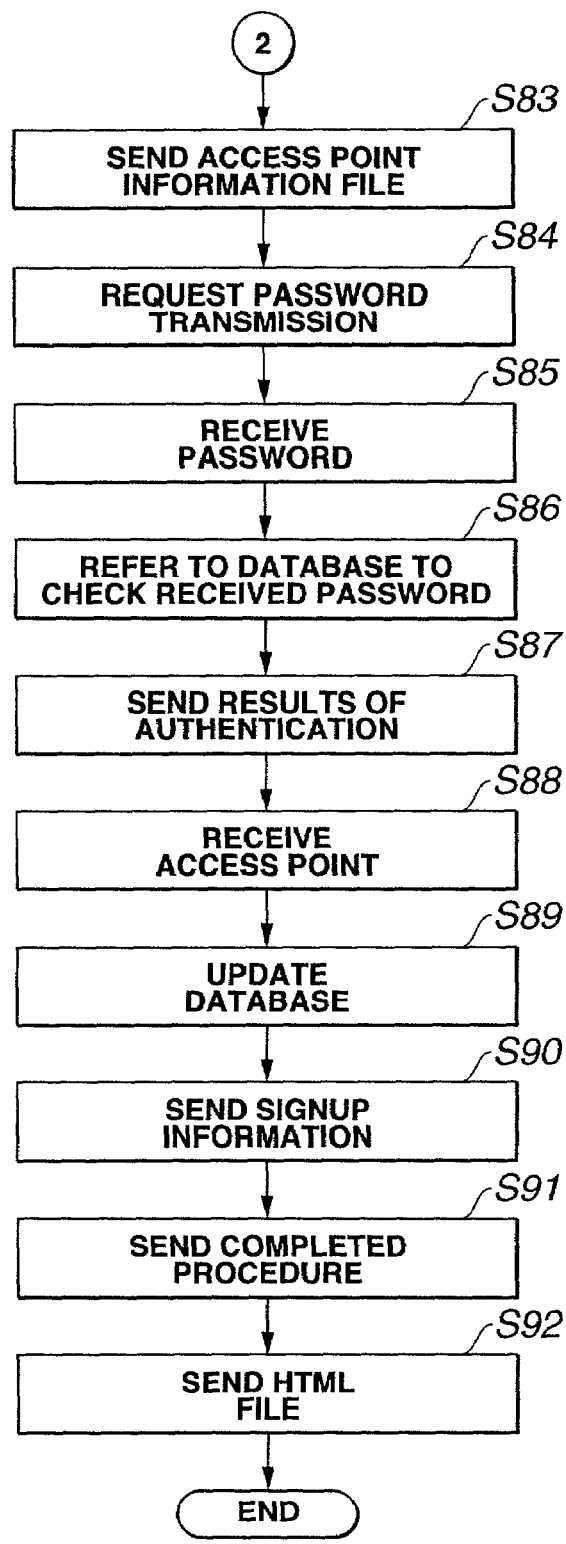
FIG. 16 is a flowchart continuing to FIGS. 14 and 15.

Referring to the flowcharts of FIGS. 14 to 16, the processing of sign-up executed by the network management server 1 is explained.

At step S61, the network management server 1 verifies whether or not the connection from the information processing apparatus 4 over the Internet 3 has been completed, and waits until such connection is made. When the information processing apparatus 4 is connected over the Internet 3, the program moves to step S62 where the network management server 1 receives the equipment serial number transmitted from the information processing apparatus 4 over the Internet 3.

At step S63, the network management server 1 references the database 2 to retrieve the equipment serial number received in the processing at step S62. At step S64, the network management server 1 verifies whether or not, as a result of retrieval processing at step S63, the equipment serial number has been found in the database 2.

For example, if, in the instance shown in FIG. 3, the equipment serial number as received is [00001] or [00002], this equipment serial number is verified to have already been recorded in the database 2. If the equipment serial number as received indicates other equipment serial number(s), the equipment serial number is verified to be an equipment serial number not as yet recorded in the database 2.

If it is verified at step S64 that the equipment serial number has not been found in the database 2, that is that no advance notification for an application form for purchase has been received from the user of the information processing apparatus 4; the program moves to step S65.

At steps S65 to S67, the network management server 1 sends a command for instructing the start of manual setting, a protocol file and the access point information file; over the Internet 3 to the information processing apparatus 4.

On receipt of these information, the CPU 11 of the information processing apparatus 4 causes the data input picture shown in FIG. 8 to be displayed on the output unit 17. In accordance with this data input picture, the user inputs the user information, using the input unit 16, presses the OK button 51 to send the user information over the Internet 3 to the network management server 1.

At step S68, the network management server 1 receives the user information, sent from the information processing apparatus 4 over the Internet 3. At step S69, the network management server 1 executes authentication as to whether or not there is any error in the user information received in the processing at step S68.

If, as a result of authentication processing at step S70, the network management server 1 has found that there is no error in the user information, the information is recorded in the database 2 in association with the equipment serial number received in the processing at step S62.

At step S71, the network management server 1 sends the results of authentication of step S69 over the Internet 3 to the information processing apparatus 4.

On receipt of the results of authentication, the CPU 11 of the information processing apparatus 4 causes the setting end picture shown in FIG. 10 to be displayed in the output unit 17. The user who has confirmed this setting end picture may then press the OK button 62, with the aid of the input unit 16, to notify the effect of termination of the confirmation to the network management server 1.

On receipt of the notice of the end of the confirmation, the network management server 1 at step S72 notifies (transmits) of the effect of the end of the procedure to the information processing apparatus 4 over the Internet 3. At step S73, the network management server 1 transmits the HTML (hypertext markup language) file, accessed by the information processing apparatus 4, to the information processing apparatus 4 over the Internet 3. Subsequently, the network management server 1 is able to furnish the services to the information processing apparatus 4 over the Internet 3.

If it is verified at step S64 that the equipment serial number has been found in the database 2, the program moves to step S81 where the network management server 1 further verifies whether or not the check on admittance or non-admittance recorded in the database 2 in association with the equipment serial number received in the processing at step S62 indicates the admittance.

If the results of check at step S81 indicates non-admittance, that is indicates that the notice of the application form for purchase has been received at the outset from the user of the information processing apparatus 4, the program moves to step S82.

At steps S82 and S83, the network management server 1 sends the command for start of automatic setting and the access point information file to the information processing apparatus 4 over the Internet 3. At step, S84, 6the network management server 1 requests the sending of the password to the information processing apparatus 4 over the Internet 3.

The CPU 11 of the information processing apparatus 4, which has received these information, causes the data input picture, shown in FIG. 12, to be displayed in the output unit 17. In accordance with this data input picture, the user inputs the password to the password input area 71, using the input unit 16, and presses the OK button 72, to send the password over the Internet 3 to the network management server 1.

At step S85, the network management server 1 receives the password transmitted from the information processing apparatus 4 over the Internet 3. At step S86, the network management server 1 references the database 2, to check whether or not the password received in the processing at step S85 is valid.

For example, if, in the instance shown in FIG. 3, the password transmitted from the information processing apparatus 4 with the equipment serial number of [00001] is [12345], the password is verified to be coincident, so that the user is identified as being the user of the information processing apparatus 4.

At step S87, the network management server 1 sends the results of authentication by the processing at step 86 over the Internet 3 to the information processing apparatus 4.

If the user of the information processing apparatus 4, which has received the results of authentication, specifies a preset access point geographically proximate to the user's territory, by selecting the access point through the input unit 16, the information is sent over the Internet 3 to the network management server 1.

At step S88, the network management server 1 receives the information pertinent to a preset access point over the Internet 3 from the information processing apparatus 4. At step S89, the network management server 1 post-records the information, received in the processing at step S88, in the database 2.

At step S90, the network management server 1 reads out the user information and the server information, required for sign-up, from the database 2, to send the information over the Internet 3 to the information processing apparatus 4.

At step S91, the network management server 1 notifies (sends) the effect of the end of the procedure to the information processing apparatus 4 over the internet 6. At step S92, the network management server 1 sends the HTML file, accessed by the information processing apparatus 4, over the Internet 3 to the information processing apparatus 4. Subsequently, the network management server 1 is able to furnish the services over the Internet to the information processing apparatus 4.

If the check at step S81 as to admittance or non-admittance recorded in the database 2 in association with the equipment serial number transmitted, indicates the admittance, that is if it is found that the sign-up procedure has already come to a close, the program moves to step S101 where the network management server 1 sends a command instructing an error dialog display over the Internet 3 to the information processing apparatus 4 to terminate the processing.

The CPU 11 of the information processing apparatus 4, which has received this command, causes the message reading: [The registration has already come to a close] to be displayed, as shown in FIG. 13, to notify the user that the sign-up procedure has already come to a close.

The network management server 1, described above, is able to grasp the optimum setting environment (manual or automatic setting) required by the information processing apparatus 4 instantly by checking whether or not the equipment serial number received from the information processing apparatus 4 has been recorded in the database 2. The network management server 1 sends a preset command, which will enable the information processing apparatus 4 to perform suitable processing of sign-up, to the information processing apparatus 4. This enables the user to effect sign-up in an optimum setting environment.

Figure 17:
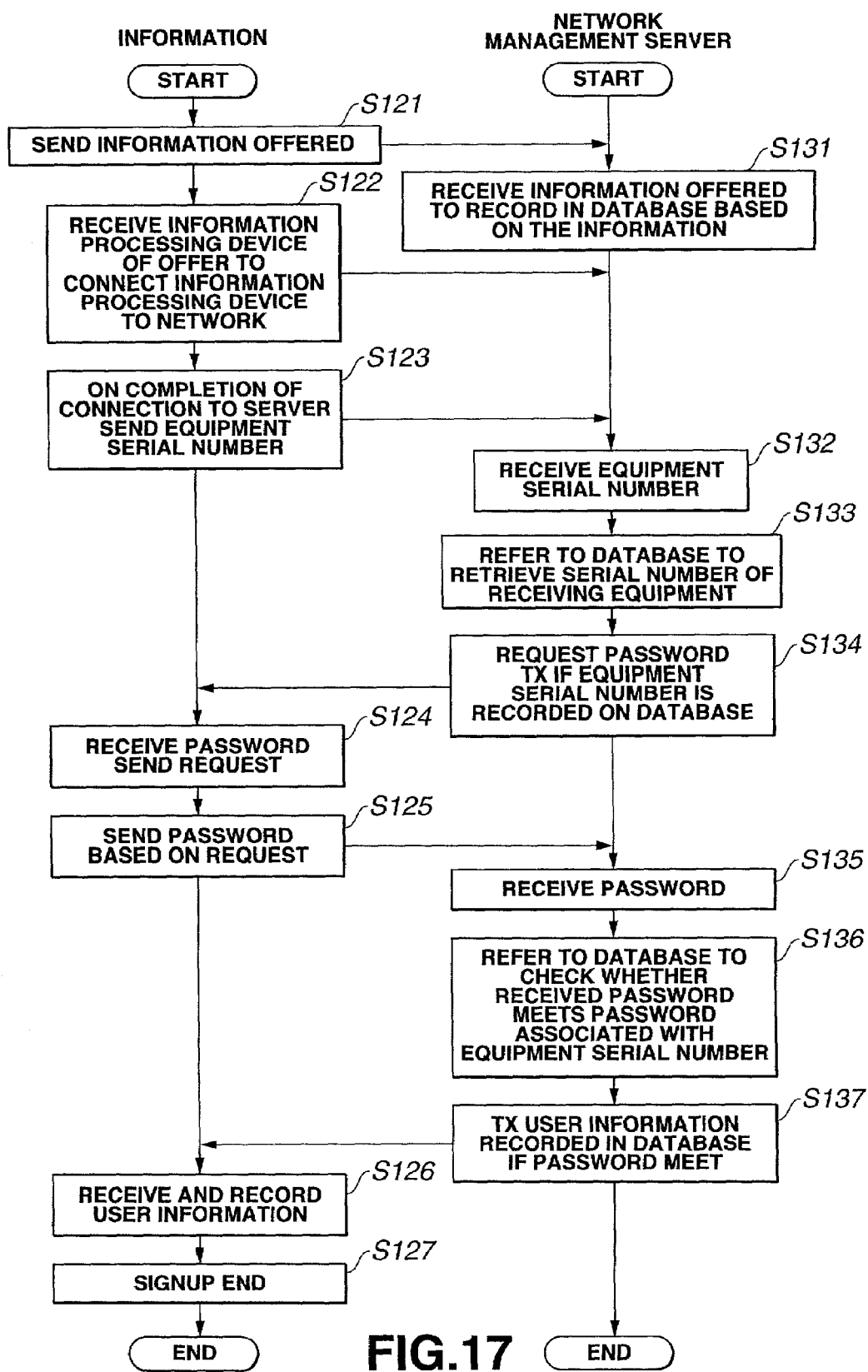
FIG. 17 is a flowchart for illustrating processing of sign-up executed by a sign-up system.

The processing of the above-described respective units may be summarized in FIG. 17 such as to clarify the sequence of the processing in the respective units. Referring to the flowchart of FIG. 17, the processing of sign-up of the entire sign-up system by automatic setting is explained.

At step S121, the user desirous to purchase the information processing apparatus 4 enters the user information, in addition to the machine type or number of the information processing apparatus 4 the or she is desirous to purchase, in the application form for purchase. The user then forwards the application information to the network management server 1.

At step S131, the network management server 1 receives the application information from the user desirous to purchase the information processing apparatus 4, and records the application information in the database 2 in association with the equipment serial number of the information processing apparatus 4 to be delivered to the user (FIG. 3).

At step S122, the user desirous to purchase the information processing apparatus 4 accepts the information processing apparatus 4 applied for in the processing at step S121, and connects it to the network management server 1 through the Internet 3. When the connection of the information processing apparatus 4 to the server is made at step S123, the information processing apparatus 4 sends the equipment serial number to the network management server 1.

At step S132, the network management server 1 receives the serial number of the equipment transmitted from the information processing apparatus 4. At step S133, the network management server 1 references the database 2 to retrieve whether or not there is the equipment serial number received in the processing at step S132.

If the network management server 1 has verified at step S134 that the equipment serial number has been recorded in the database 2, the network management server 1 requests the information processing apparatus 4 to transmit the password.

At step S124, the information processing apparatus 4 receives the transmission of the password from the network management server 1. The user on receipt of this request inputs the same password as that entered in the application form for purchase in the processing at step S121. At step S125, the information-processing apparatus 4 sends the password input by the user.

At step S135, the network management server 1 receives the password transmitted from the information processing apparatus 4. At step S136, the network management server 1 references the database 2 to check whether or not the password recorded in association with the equipment serial number received by the processing at step S132 coincides with the password received in the processing at step S135.

If, at step S137, the network management server 1 has verified that the password as received coincides with the that recorded in the database 2, the network management server 1 reads out the user information necessary for sign-up, and the server information, from the database 2, and sends the read-out information to the information processing apparatus 4.

At step S126, the information processing apparatus 4 receives the user information and the server information, transmitted from the network management server 1, and records the received information in the storage unit 18 to complete the setting.

At step S127, the information processing apparatus 4 causes the message shown in FIG. 11 reading: [The procedure is finished] to be displayed in the output unit 17 to complete the finishing.

By the above processing, the information processing apparatus 4 is able to exploit the various services furnished from the network management server 1.

Although the above-described sequence of operations can be performed on a hardware, it may also be executed by the software. If the sequence of operations is to be executed on the software, the program forming the software is installed in a dedicated hardware built in a computer. Alternatively, the program forming the software is installed from a recording medium in e.g., a general-purpose personal computer capable of executing various functions.

The recording medium is formed not only by a package medium, such as a magnetic disc 31, inclusive of a floppy disc, an optical disc 32, inclusive of a CD-ROM (Compact Disc-Read-Only memory) and DVD (Digital Versatile Disc), a magneto-optical disc 33, inclusive of MD (Mini-Disc) or a semiconductor memory 34, but also by a ROM or a hard disc, having the program pre-recorded thereon and which is furnished to the user as it is built in the computer from the outset.

In the present specification, the steps stating the program recorded on the recording medium includes parallel processing or batch-wise processing, in addition to the processing executed chronologically in an explicitly stated sequence.

Meanwhile, the system herein means an entire apparatus comprised of plural component units.

What is claimed is:

1. A network management server connected to a network, comprising:
    recording means for recording information identifying an information processing apparatus and information of a user of said information processing apparatus,
    wherein said information processing apparatus receives a television broadcast and establishes a connection to said network management server over said network;
    receiving means for receiving identification information sent from said information processing apparatus, when said information processing apparatus is connected via said network, the identification information used to identify said information processing apparatus;

verifying means for verifying whether said identification information received by said receiving means has already been recorded by said recording means;

controlling means for controlling said information processing apparatus over said network based on verified results by said verifying means; and transmitting means for transmitting to said information processing apparatus initial sign-up information for sign-up processing for said information processing apparatus, including a protocol file stating rules for utilizing Internet services and an access point information file identifying a geographical location through which the user of said information processing apparatus may gain access to said Internet services and for transmitting to said information processing apparatus a home page established by said network management server;

wherein said transmitting means transmits results of said verification performed by said verifying means to said information processing apparatus; and wherein said verifying means, upon determining that said identification information has already been recorded by said recording means, further verifies whether sign-up processing for said information processing apparatus has previously been executed and, if so, said transmitting means transmits an error message to said information processing apparatus.

2. The network management server according to claim 1, wherein said identification information is a serial number of said information processing apparatus.

3. The network management server according to claim 1, wherein said controlling means causes said information processing apparatus to execute first setting processing upon verification that said identification information received by said receiving means has already been recorded in said recording means, said controlling means causing said information processing apparatus to execute second setting processing upon verification that said identification information received by said receiving means has not been recorded in said recording means.

4. The network management server according to claim 3, wherein said first setting processing and the second setting processing represent setting processing for said information processing apparatus to utilize said network.

5. The network management server according to claim 4, wherein said controlling means sends an address on said network of a server used for connecting said information apparatus to said network, to said information processing apparatus, and sets the address so sent, as the information necessary for said information processing apparatus to utilize said network.

6. The network management server according to claim 4, wherein said recording means further records the inherent information for specifying a user of said information processing apparatus;

said controlling means requests transmission of said inherent information to said information processing apparatus upon verification that said identification information received by said receiving means has been recorded in said recording means.

7. The network management server according to claim 6, wherein said inherent information includes a password.

8. The network management server according to claim 4, wherein upon verification that said identification information received by said receiving means has not been recorded on said recording means, said controlling means requests said information processing apparatus to transmit the information on a user utilizing said information processing apparatus.

9. An information processing method for a network management server connected to a network, comprising:

a recording controlling step of controlling recording of information identifying an information processing apparatus and information of a user of said information processing apparatus, wherein said information processing apparatus receives a television broadcast and establishes a connection to said network management server over said network;

a receiving step of receiving identification information sent from said information processing apparatus, when said information processing apparatus is connected via said network, the identification information used to identify said information processing apparatus;

a verifying step of verifying whether said identification information received in said receiving step has already been recorded in said recording controlling step;

a controlling step of controlling said information processing apparatus over said network based on results of said verifying step; and a transmitting step of transmitting to said information processing apparatus initial sign-up information for sign-up processing for said information processing apparatus, including a protocol file stating rules for utilizing Internet services and an access point information file identifying a geographical location through which the user of said information processing apparatus may gain access to said Internet services and for transmitting to said information processing apparatus a home page established by said network management server;

wherein said transmitting step transmits results of said verification performed by said verifying step to said information processing apparatus; and wherein said verifying step, upon determining that said identification information has already been recorded by said recording controlling step, further verifies whether sign-up processing for said information processing apparatus has previously been executed and, if so, said transmitting means transmits an error message to said information processing apparatus.

10. A recording medium having recorded thereon a computer-readable program for controlling a network management server connected to a network, said program including:

a recording controlling step of controlling recording of information identifying an information processing apparatus and information of a user of said information processing apparatus;

wherein said information processing apparatus receives a television broadcast and establishes a connection to said network management server over said network;

a receiving step of receiving the identification information sent from said information processing apparatus when said information processing apparatus is connected via said network, the identification information used to identify said information processing apparatus;

a verifying step of verifying whether said identification information received by the receiving step has already been recorded in said recording controlling step;

a controlling step of controlling said information processing apparatus over said network based on results by the verifying step; and a transmitting step of transmitting to said information processing apparatus initial sign-up information for sign-up processing for said information processing apparatus, including a protocol file stating rules for utilizing Internet services and an access point information file identifying a geographical location through which the user of said information processing apparatus may gain access to said Internet services and for transmitting to said information processing apparatus a home page established by said network management server;

wherein said transmitting step transmits results of said verification performed by said verifying step to said information processing apparatus; and wherein said verifying step, upon determining that said identification information has already been recorded by said recording controlling step, further verifies whether sign-up processing for said information processing apparatus has previously been executed and, if so, said transmitting means transmits an error message to said information processing apparatus.

11. An information processing apparatus connected to a network, comprising:

storage means for storing at least identification information used to identify said information processing apparatus;

establishing means for establishing a connection to a network management server over said network;

receiving means for receiving a television broadcast;

transmission means for transmitting said identification information stored in said storage means over said network to said network management server;

receiving means for receiving control information transmitted from said network management server over said network, based on said identification information transmitted from said transmission means, said control information including initial sign-up information for sign-up processing for said information processing apparatus, a protocol file stating rules for utilizing Internet services and an access point information file identifying a geographical location through which the user of said information processing apparatus may gain access to said Internet services and said receiving means receiving a home page established by said network management server; and setting means for setting information necessary for utilizing said network based on said control information received by said receiving means, wherein said information processing apparatus selects from said access point information file a preset access point geographically proximate to said information processing apparatus;

wherein said receiving means receives results of a verification of said identification information performed by said network management server and wherein said network management server, upon determining that said identification information has already been recorded in said network management server, further verifies whether sign-up processing for said information processing apparatus has previously been executed and, if so, said receiving means receives an error message from said network management server.

12. The information processing apparatus according to claim 11, wherein said setting means sets information necessary for exploiting said network in a first mode when said control information received by said receiving means is first control information;

said setting means setting information necessary for exploiting said network in a second mode when said control information received by said receiving means is second control information.

13. The information processing apparatus according to claim 11, wherein said setting means executes first setting processing when identification information transmitted by said transmission means has already been recorded in said network management server;

said setting means executing second setting processing when identification information transmitted by said transmission means has already been recorded in said network management server.

14. The information processing apparatus according to claim 13, wherein said first setting processing and said second setting processing represent information setting processing necessary for said information processing apparatus to utilize said network.

15. The information processing apparatus according to claim 14, wherein said setting means sets an address on said network of a server connecting said information processing apparatus to said network, said address received by said receiving means.

16. The information processing apparatus according to claim 11, wherein said network management server stores inherent information used for specifying a user of said information processing apparatus;

said setting means transmitting said inherent information to said network management server if said identification information transmitted by said transmission means has been recorded in said network management server.

17. The information processing apparatus according to claim 16, wherein said inherent information includes a password.

18. The information processing apparatus according to claim 11, wherein said setting means transmits information pertinent to a user employing said information processing apparatus to said network management server if said identification information transmitted by said transmission means has not been recorded in said network management server.

19. An information processing method for an information processing apparatus connected to a network, comprising:

a storage controlling step of controlling storage of identification information used to identify said information processing apparatus;

an establishing step of establishing a connection to a network management server over said network;

a receiving step of receiving a television broadcast;

a transmission step of transmitting said identification information stored during said storage controlling step over said network to said network management server;

a receiving step of receiving control information transmitted from said network management server over said network, based on said identification information transmitted by processing in said transmission step, said control information including initial sign-up information for sign-up processing for said information processing apparatus, a protocol file stating rules for utilizing Internet services and an access point information file identifying a geographical location through which the user of said information processing apparatus may gain access to said Internet services and said receiving means receiving a home page established by said network management server; and a setting step of setting information necessary for utilizing said network based on said control information received by processing in said receiving step, wherein said information processing apparatus selects from said access point information file a preset access point geographically proximate to said information processing apparatus;

wherein said receiving step receives results of a verification of said identification information performed by said network management server and wherein said network management server, upon determining that said identification information has already been recorded in said network management server, further verifies whether sign-up processing for said information processing apparatus has previously been executed and, if so, an error message is received from said network management server.

20. A computer-readable medium adapted to store a computer program for controlling an information processing apparatus connected to a network, said computer program including:

a storage controlling step of controlling storage of identification information used to identify said information processing apparatus;

an establishing step of establishing a connection to a network management server over said network;

a receiving step of receiving a television broadcast;

a transmission step of transmitting said identification information stored during said storage controlling step over said network to said network management server;

a receiving step of receiving control information transmitted from said network management server over said network, based on said identification information transmitted by processing in said transmission step, said control information including initial sign-up information for sign-up processing for said information processing apparatus, a protocol file stating rules for utilizing Internet services and an access point information file identifying a geographical location through which the user of said information processing apparatus may gain access to said Internet services and said receiving means receiving a home page established by said network management server; and a setting step of setting information necessary for utilizing said network based on said control information received by processing in said receiving step, wherein said information processing apparatus selects from said access point information file a preset access point geographically proximate to said information processing apparatus;

wherein said receiving step receives results of a verification of said identification information performed by said network management server and wherein said network management server, upon determining that said identification information has already been recorded in said network management server, further verifies whether sign-up processing for said information processing apparatus has previously been executed and, if so, an error message is received from said network management server.

* * * * *